US010442908B2

(12) United States Patent
Uno et al.

(10) Patent No.: US 10,442,908 B2
(45) Date of Patent: Oct. 15, 2019

(54) FOAM, LAMINATE, AND FORMED PRODUCT

(71) Applicant: SEKISUI CHEMICAL CO., LTD., Osaka (JP)

(72) Inventors: Takumei Uno, Kariya (JP); Hiroki Mikami, Hitachiomiya (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 15 days.

(21) Appl. No.: 15/509,578

(22) PCT Filed: Sep. 9, 2015

(86) PCT No.: PCT/JP2015/075663
§ 371 (c)(1),
(2) Date: Mar. 8, 2017

(87) PCT Pub. No.: WO2016/039400
PCT Pub. Date: Mar. 17, 2016

(65) Prior Publication Data
US 2017/0260349 A1 Sep. 14, 2017

(30) Foreign Application Priority Data

Sep. 10, 2014 (JP) ................ 2014-184305

(51) Int. Cl.
| | | |
|---|---|---|
| *C08J 9/00* | (2006.01) | |
| *C08J 9/228* | (2006.01) | |
| *B32B 5/24* | (2006.01) | |
| *B32B 3/30* | (2006.01) | |
| *B32B 5/18* | (2006.01) | |
| *C08J 9/10* | (2006.01) | |

(52) U.S. Cl.
CPC ............ *C08J 9/0061* (2013.01); *B32B 3/30* (2013.01); *B32B 5/18* (2013.01); *B32B 5/24* (2013.01); *C08J 9/00* (2013.01); *C08J 9/103* (2013.01); *C08J 9/228* (2013.01); *B32B 2307/72* (2013.01); *B32B 2309/105* (2013.01); *C08J 2205/06* (2013.01); *C08J 2323/12* (2013.01); *C08J 2423/06* (2013.01); *C08J 2423/08* (2013.01); *C08J 2423/10* (2013.01); *C08J 2423/12* (2013.01); *C08L 2203/14* (2013.01); *C08L 2205/03* (2013.01)

(58) Field of Classification Search
CPC .. C08J 9/0061; C08J 2323/06; C08J 2323/12; C08J 2423/06; C08J 2423/12; C08J 9/228; C08J 2205/06; B32B 3/30; B32B 5/18; B32B 2307/72; C08L 2203/14; C08L 2205/03
See application file for complete search history.

(56) References Cited

U.S. PATENT DOCUMENTS

2009/0324901 A1* 12/2009 Hashiba ............... B29C 51/002
428/195.1

FOREIGN PATENT DOCUMENTS

| CN | 101039795 | | 9/2007 |
|---|---|---|---|
| JP | 4-80237 | | 3/1992 |
| JP | 04080237 A | * | 3/1992 |
| JP | 5-295149 | | 11/1993 |
| JP | 6-192461 | | 7/1994 |
| JP | 7-149970 | | 6/1995 |
| JP | 2004-149665 | | 5/2004 |
| JP | 2004149665 A | * | 5/2004 |
| JP | 2004-339361 | | 12/2004 |
| JP | 2004-339362 | | 12/2004 |
| JP | 2004339362 A | * | 12/2004 |
| JP | 5217164 | | 6/2013 |

OTHER PUBLICATIONS

JP2004-339362A translation (Year: 2004).*
JP2004-149665A translation (Year: 2004).*
JP H04080237 translation (Year: 1992).*
International Search Report dated Dec. 22, 2015 in International (PCT) Application No. PCT/JP2015/075663.
Extended European Search Report dated Jan. 4, 2018 in corresponding European Application No. 15839885.9.

* cited by examiner

*Primary Examiner* — Scott R. Walshon
*Assistant Examiner* — Jasper Saberi
(74) *Attorney, Agent, or Firm* — Wenderoth, Lind & Ponack, L.L.P.

(57) ABSTRACT

The present invention relates to a foam having a density of 0.036 g/cc or more and less than 0.133 g/cc, having an elongation (%) at break at 160° C. of 150% or more as measured in accordance with JIS K6251, a value of 7 or more obtained by multiplying the elongation (%) at break by a 100% modulus (MPa) at 160° C. as measured in accordance with JIS K6251, and a cross-linking degree of 30 to 50%.

17 Claims, No Drawings

FOAM, LAMINATE, AND FORMED PRODUCT

TECHNICAL FIELD

The present invention relates to a foam, more specifically a cross-linked polyolefin resin foam made by cross-linking a foamable composition and causing the composition to foam.

BACKGROUND ART

Cross-linked polyolefin resin foams are widely used as insulators, cushions, etc. In an automobile field, in particular, the foams are used as materials for vehicle interior including a ceiling, a door, and an instrument panel. These materials for vehicle interior are typically formed into a predetermined shape from a cross-linked polyolefin resin foam in a sheet form by fabrication such as vacuum forming and compression molding. On the cross-linked polyolefin resin foam, a sheet of resin or elastomer such as polyvinylchloride resin or thermoplastic elastomer, or a sheet material such as natural or artificial fabric is laminated to form a laminate for wide use.

Various cross-linked polyolefin resin foams used for vehicle interior are known. For example, a resin composition having a DSC peak temperature of 160° C. or higher for improving formability and processability, and heat resistance is known, which is formed of a mixture of three resins: a polypropylene resin (A) of a homopolypropylene or an ethylene-propylene random copolymer, a polypropylene resin (B) of an ethylene-propylene random copolymer or the like, and a polyethylene resin (C) (for example, refer to PTL1).

CITATION LIST

Patent Literature

PTL1: JP 5217164 B

SUMMARY OF INVENTION

Technical Problem

Due to the recent requirement for high designability of materials for vehicle interior, imparting complicated patterns on a sheet material to be laminated on a foam has been investigated. For example, in vacuum forming, instead of conventionally mainstream forming over a male mold, forming in a female mold has been investigated for improving the designability. In the vacuum forming of a laminate composed of a foam and a sheet material in a female mold, the sheet material is disposed adjacent to the mold, so that the projection and depression pattern formed on the mold tends to be accurately transferred to the sheet material.

In order to accurately transfer projection and depression pattern on the mold to the sheet material, however, the forming temperature is required to be elevated to 160° C. or higher, for example. A foam heated to 160° or higher causes foam rupture during vacuum forming in some cases, because the temperature exceeds the melting point of polypropylene which is typically the main component of a foam.

It is an object of the present invention, in view of these circumstances, to provide a foam having a good formability, wherein foam rupture or the like is prevented even when the forming temperature is elevated to form a formed product from the foam.

Solution to Problem

Through extensive investigation, the present inventor found that the problem can be solved by controlling the cross-linking degree within a specified range and increasing both of the elongation (%) at break at 160° C. and the value (SS coefficient) obtained by multiplying the elongation (%) at break at 160° C. by a 100% modulus (MPa) at 160° C., thus accomplishing the present invention described below.

In other words, the following (1) to (16) are provided by the present invention.

(1) A foam having a density of 0.036 g/cc or more and less than 0.133 g/cc, wherein the foam has an elongation (%) at break at 160° C. of 150% or more as measured in accordance with JIS K6251, and wherein the foam has a value of 7 or more obtained by multiplying the elongation (%) at break by a 100% modulus (MPa) at 160° C. as measured in accordance with JIS K6251, and a cross-linking degree of 30 to 50%.

(2) The foam according to the above (1) having a density of 0.036 g/cc or more and less than 0.044 g/cc, wherein the foam has an elongation (%) at break at 160° C. of 150% or more as measured in accordance with JIS K6251, and wherein the foam has a value of 7 or more obtained by multiplying the elongation (%) at break by a 100% modulus (MPa) at 160° C. as measured in accordance with JIS K6251.

(3) The foam according to the above (1) having a density of 0.044 g/cc or more and less than 0.057 g/cc, wherein the foam has an elongation (%) at break at 160° C. of 170% or more as measured in accordance with JIS K6251, and wherein the foam has a value of 8 or more obtained by multiplying the elongation (%) at break by a 100% modulus (MPa) at 160° C. as measured in accordance with JIS K6251.

(4) The foam according to the above (1) having a density of 0.057 g/cc or more and less than 0.077 g/cc, wherein the foam has an elongation (%) at break at 160° C. of 200% or more as measured in accordance with JIS K6251, and wherein the foam has a value of 10 or more obtained by multiplying the elongation (%) at break by a 100% modulus (MPa) at 160° C. as measured in accordance with JIS K6251.

(5) The foam according to the above (1) having a density of 0.077 g/cc or more and less than 0.133 g/cc, wherein the foam has an elongation (%) at break at 160° C. of 250% or more as measured in accordance with JIS K6251, and wherein the foam has a value of 15 or more obtained by multiplying the elongation (%) at break by a 100% modulus (MPa) at 160° C. as measured in accordance with JIS K6251.

(6) The foam according to any one of the above (1) to (5), wherein the foam is made by cross-linking and foaming a foamable composition comprising a homopolypropylene (A), a random polypropylene (B) and a linear low-density polyethylene (C), and wherein the homopolypropylene (A) is in an amount of 10 to 60 mass % relative to the total resin components in the foamable composition, and has a melt flow rate of 2.5 to 20 g/10 min.

(7) The foam according to the above (6), wherein the homopolypropylene (A) has a melt flow rate of 6 to 12 g/10 min.

(8) The foam according to the above (6) or (7), wherein the foamable composition comprises the homopolypropylene (A), the random polypropylene (B) and the linear low-density polyethylene (C) in a mass ratio (B)/(A) of 0.16 to 8 and a mass ratio (C)/(A) of 0.16 to 8.

(9) The foam according to any one of the above (6) to (8), wherein the foamable composition comprises 10 mass % or more and less than 20 mass % of the homopolypropylene (A) relative to the total resin components in the composition.

(10) The foam according to the above (9), wherein the foamable composition comprises the homopolypropylene (A), the random polypropylene (B) and the linear low-density polyethylene (C) in a mass ratio (B)/(A) of 1.6 to 5 and a mass ratio (C)/(A) of 1.6 to 5.

(11) The foam according to any one of the above (6) to (10), wherein the random polypropylene (B) has a melt flow rate of 0.4 to 2.0 g/10 min, and the linear low-density polyethylene (C) has a melt flow rate of 1.5 to 15 g/10 min.

(12) The foam according to any one of the above (6) to (11), wherein the random polypropylene (B) is an ethylene-propylene random copolymer.

(13) The foam according to any one of the above (1) to (12), having a sheet form with a thickness of 0.5 to 5.0 mm.

(14) A laminate comprising the foam according to any one of the above (1) to (13) and a sheet material laminated on the foam.

(15) A formed product formed from the foam according to any one of the above (1) to (13) or the laminate according to the above (14).

(16) A formed product formed from the laminate according to the above (14), wherein the sheet material has a surface with projection and depression pattern.

Advantageous Effects of Invention

According to the present invention, a foam having a good formability is provided where foam rupture or the like is prevented even when forming temperature is elevated to form a formed product from the foam.

DESCRIPTION OF EMBODIMENTS

The present invention is further described in detail with reference to embodiments as follows.
<Foam>
The foam of the present invention having a density of 0.036 g/cc or more and less than 0.133 g/cc has an elongation (%) at break at 160° C. of 150% or more as measured in accordance with JIS K6251, and a value of 7 or more (hereinafter also referred to as "SS coefficient) obtained by multiplying the elongation (%) at break by a 100% modulus (MPa) at 160° C. as measured in accordance with JIS K6251.

The present foam having a density in a specified range, with a high elongation (%) at break and a high SS coefficient as described above hardly causes foam rupture or the like even at a raised forming temperature (e.g. 160° C. or higher), being suitable for forming into various formed products such as materials for vehicle interior.

In contrast, a foam with an elongation (%) at break at 160° C. of less than 150% or with an SS coefficient of less than 7 causes foam rupture or the like during forming to a formed product at a high temperature, resulting in difficulty in achieving good formability. Furthermore, a foam having a density of less than 0.036 g/cc or a density of more than 0.133 g/cc, physical properties required for a formed product such as materials for vehicle interior such as flexibility and mechanical strength tend to be hardly obtained.

In addition, from the viewpoint of easiness of manufacturing or the like, the elongation at break at 160° C. and the SS coefficient are preferably 400% or less and 30 or less, respectively, though not specifically limited.

In the present invention, the cross-linking degree of a foam is 30 to 50%. With a cross-linking degree of less than 30%, the mechanical strength of the foam decreases and the SS coefficient lowers to cause foam rupture or the like during forming, resulting in poor formability of the foam. Furthermore, the below-mentioned shear viscosity required for the foaming of a foamable composition cannot be imparted in some cases.

On the other hand, with a cross-linking degree of more than 50%, the elasticity and tensile strength of a foam decrease, resulting in problems such as the difficulty in accurate forming of a formed product in accordance with a pattern and the foam rupture. Furthermore, the shear viscosity of the foamable composition increases excessively to lower the foaming properties, resulting in the difficulty in obtaining a foam having a high foaming ratio and the poor appearance of a foam in some cases.

The cross-linking degree is calculated from the following formula, wherein A represents the weight of a test piece and B represents the weight of solvent-insoluble components. The solvent-insoluble components are sampled by the method described in Examples to obtain the weight A of the test piece and the weight B of the solvent-insoluble components.

$$\text{Cross-linking degree (wt \%)} = (B/A) \times 100$$

From the viewpoint of improving the formability and the mechanical strength of a foam, the cross-linking degree of a foam is preferably 32 to 48%, more preferably 35 to 45%.

A foam in a sheet form is preferred. The specific thickness of a foam is preferably 0.5 to 5.0 mm, more preferably about 1 to 4 mm. With a thickness in the range, the foam can be easily formed into a material for vehicle interior by vacuum forming or the like.

In forming of a foam, the optimum mechanical properties such as the elongation at break and the modulus are different depending on the density of the foam. For example, a low-density foam having a density of 0.036 g/cc or more and less than 0.044 g/cc preferably has an elongation (%) at break at 160° C. of 150% or more as measured in accordance with JIS K6251 and an SS coefficient of 7 or more.

Such a low-density foam described above can be formed with a relatively weak force, so that the elongation at break and the SS strength are not required to be very high. In other words, a low-density foam with an elongation at break of the value or more and an SS coefficient of the value or more can have sufficient formability. For example, by using a below-described foamable composition, a low-density foam having such an elongation at break and such an SS coefficient can be easily manufactured.

From the viewpoint of being both easily manufacturable and well formable, more preferably the low-density foam has an elongation at break of 160 to 240% and an SS coefficient of about 7.5 to 15.

A medium low-density foam having a density of 0.044 g/cc or more and less than 0.057 g/cc preferably has an elongation (%) at break at 160° C. of 170% or more as measured in accordance with JIS K6251 and an SS coefficient of 8 or more. A medium low-density foam with an elongation at break of the lower limit or more and an SS coefficient of the lower limit or more can have sufficient formability. For example, by using a below-described foamable composition, a medium low-density foam having an elongation at break of the lower limit or more and an SS coefficient of the lower limit or more can be easily manufactured. From the viewpoint of achieving both of the formability and the easiness in manufacturing, more preferably the medium low-density foam has an elongation at break of 180 to 300% and an SS coefficient of about 8.5 to 20.

A medium high-density foam having a density of 0.057 g/cc or more and less than 0.077 g/cc preferably has an elongation (%) at break at 160° C. of 200% or more as measured in accordance with JIS K6251 and an SS coefficient of 10 or more. A medium high-density foam with an elongation at break of the lower limit or more and an SS coefficient of the lower limit or more can have sufficient formability. For example, by using a below-described foamable composition, a medium high-density foam having an elongation at break of the lower limit or more and an SS coefficient of the lower limit or more can be easily manufactured. From the viewpoint of being both easily manufacturable and well formable, more preferably the medium high-density foam has an elongation at break of 220 to 360% and an SS coefficient of about 12 to 25.

A high-density foam having a density of 0.077 g/cc or more and less than 0.133 g/cc preferably has an elongation (%) at break at 160° C. of 250% or more as measured in accordance with JIS K6251 and an SS coefficient of 15 or more. In order to have a good formability, a high-density foam needs to have a relatively high elongation at break and a relatively high SS strength. The high-density foam with an elongation at break of the lower limit or more and an SS coefficient of the lower limit or more can have sufficient formability. For example, by using a below-described foamable composition, a high-density foam having an elongation at break of the lower limit or more and an SS coefficient of the lower limit or more can be easily manufactured. From the viewpoint of being both easily manufacturable and well formable, more preferably the high-density foam has an elongation at break of 300 to 400% and an SS coefficient of about 15 to 30.

<Foamable Composition>

The foam of the present invention is made by cross-linking a foamable composition and causing the composition to foam. The foam is, for example, a cross-linked polyolefin resin foam. The foamable composition to constitute the cross-linked polyolefin resin foam includes, for example, a homopolypropylene (A), a random polypropylene (B), and a linear low-density polyethylene (C). The foamable composition containing the components (A) to (C), with the below-mentioned specified amount of component (A), allows the foam to easily have an elongation (%) at break at 160° C. of the specified value or more and an SS coefficient of the specified value or more.

The components (A) to (C) for use in the foamable composition are described as follows.

<Component (A)>

The homopolypropylene (A) is a propylene homopolymer, having a melt flow rate (hereinafter also referred to as "MFR") of preferably 2.5 to 20 g/10 min. At an MFR of the homopolypropylene (A) of 2.5 g/10 min or more and 20 g/10 min or less, the flow properties of the resin are good and prevented from becoming too high, and therefore the processability of the foamable composition is good in forming a foam. As a result, for example, the surface of a foam is prevented from being roughened and the difficulty in processing the foamable composition to a foam in a sheet form is avoided.

From the viewpoint of better processability, the homopolypropylene (A) has an MFR of preferably 4 to 16 g/10 min, more preferably 6 to 12 g/10 min.

The content of the homopolypropylene (A) in a foamable composition is preferably 10 to 60 mass % relative to the total content of the resin components contained in a foamable composition. With the homopolypropylene in an amount of 10 mass % or more, the mechanical strength and the SS coefficient of the foam increase, so that the rupture of a formed product hardly occurs during forming. With a content of 60 mass % or less, the tensile strength, the elasticity, and the like of the foam increase, so that a formed product can be more easily formed accurately in accordance with a pattern, and problems such as rupture hardly occur.

The content of the homopolypropylene (A) is preferably 10 to 40 mass %, more preferably 10 mass % or more and less than 20 mass %, relative to the total content of the resin components. In the present invention, making the content of the component (A) relatively small provides a good processability for the foamable composition to form a foam as well as both a better tensile strength and a better SS coefficient for the foam, resulting in a tendency for the foam to have a higher formability.

<Components (B) and (C)>

The random polypropylene (B) is a copolymer which is obtained by random copolymerizing propylene and an α-olefin other than propylene. Examples of the α-olefin other than propylene include ethylene having two carbon atoms, or an α-olefin having about 4 to 10 carbon atoms such as 1-butene, 1-pentene, 1-hexene, 4-methyl-1-pentene, 1-heptene, and 1-octene. In particular, ethylene is preferred from the viewpoint of formability and heat resistance. In other words, the random polypropylene (B) is preferably an ethylene-propylene random copolymer.

In a copolymer, the α-olefins may be used singly or two or more may be used in combination. Alternatively, a mixture of two or more types of random polypropylene may be used as the component (B).

Preferably, the random polypropylene (B) is obtained by copolymerizing propylene in an amount of 50 wt % or more and less than 100 wt % and an α-olefin other than propylene in an amount of 50 wt % or less. Relative to the total monomer components to constitute a copolymer, a content of propylene of 80 to 99.9 wt % and a content of an α-olefin other than propylene of 0.1 to 20 mass % are more preferred, a content of propylene of 90 to 99.5 wt % and a content of an α-olefin other than propylene of 0.5 to 10 mass % are still more preferred, and a content of propylene of 95 to 99 wt % and a content of an α-olefin other than propylene of 1 to 5 mass % are further preferred.

The linear low-density polyethylene (C) is a polyethylene having a density of 0.910 g/cm$^3$ or more and less than 0.950 g/cm$^3$, preferably 0.910 to 0.930 g/cm$^3$. A foam containing the linear low-density polyethylene (C) with a low density in addition to the components (A) and (B) has a good processability in processing a foamable composition to a foam. In addition, appropriate values of the elongation at break and the SS coefficient described above can be obtained, and thus a good formability or the like tends to be achieved in forming a formed product from a foam.

The linear low-density polyethylene (C) is typically a copolymer of ethylene and a small amount of α-olefin, which is mainly composed of ethylene (50 mass % or more, preferably 70 mass % or more, relative to the total monomers). Examples of the α-olefin include ones having 3 to 12 carbon atoms, preferably 4 to 10 carbon atoms. Specific examples include 1-butene, 1-pentene, 1-hexene, 4-methyl-1-pentene, 1-heptene and 1-octene.

The foamable composition preferably contains the component (A), the random polypropylene (B) and the linear low-density polyethylene (C) preferably at a mass ratio of (B)/(A) of 0.16 to 8 and a mass ratio of (C)/(A) of 0.16 to 8, more preferably at a mass ratio of (B)/(A) of 1.6 to 5 and a mass ratio of (C)/(A) of 1.6 to 5. Still more preferably, the foamable composition contains the component (A), the random polypropylene (B) and the linear low-density polyethylene (C) at a mass ratio of (B)/(A) of 2.5 to 4.5 and a mass ratio of (C)/(A) of 1.5 to 4.0, and preferably the content (mass) of the component (B) is higher than the content of the component (C). In the present invention, with the components (B) and (C) in the range, a good processability in forming a foam can be obtained. In addition, the elongation at break and the SS coefficient tend to be increased, so that good formability of a foam can be easily obtained.

The content of the random polypropylene (B) is preferably 5 to 80 mass %, more preferably 15 to 60 mass %, still more preferably 40 to 60 mass %, relative to the total resin components. The content of the linear low-density polyethylene (C) is preferably 5 to 80 mass %, more preferably 15 to 60 mass %, still more preferably 20 to 40 mass %, relative to the total resin components.

Preferably the random polypropylene (B) has an MFR of 0.4 to 2.0 g/10 min, and the linear low-density polyethylene (C) has an MFR of 1.5 to 15 g/10 min. More preferably the component (B) has an MFR of 0.5 to 1.5 g/10 min, and the component (C) has an MFR of 2 to 12 g/10 min. In the present invention, each of the MFR of the components (B) and (C) as well as the component (A) is adjusted as described above, so that the processability of the foamable composition into a foam, the formability of the foam, and the like tend to be improved.

<Other Components>

Although the foamable composition may contain the components (A), (B) and (C) only as the resin components, a resin component other than the components (A), (B) and (C) may be contained within the range not impeding the object of the present invention. Examples of the resin component other than the components (A), (B) and (C) include a polyethylene other than the component (C) such as a high-density polyethylene, an ethylene-propylene block copolymer, a polypropylene other than the components (A) and (B) such as a modified polypropylene resin, an ethylene-propylene rubber (EPM), an ethylene-propylene rubber-diene rubber (EPDM), an ethylene-vinyl acetate copolymer, an ethylene-acrylic acid copolymer, an ethylene-alkyl (meth)acrylate copolymer, and a modified copolymer of these copolymerized with maleic anhydride. The content of the resin component other than the components (A), (B) and (C) is typically 30 mass % or less, preferably 10 mass % or less, relative to the total resin components.

<Additive>

The foamable composition typically contains a foaming agent as additive, and preferably contains one or both of a cross-linking aid and an antioxidant.

(Foaming Agent)

A thermally decomposable foaming agent can be used as forming agent. For example, an organic or inorganic chemical foaming agent can be used, having a decomposition temperature of about 160° C. to 270° C.

Examples of the organic foaming agent include: an azo compound such as azodicarbonamide, a metal azodicarboxylate (e.g. barium azodicarboxylate), and azobisisobutyronitrile; a nitroso compound such as N,N'-dinitrosopentamethylenetetramine; a hydrazine derivative such as hydrazodicarbonamide, 4,4'-oxybis(benzenesulfonyl hydrazide), and toluenesulfonyl hydrazide; and a semicarbazide compound such as toluenesulfonyl semicarbazide.

Examples of the inorganic foaming agent include an acid ammonium, sodium carbonate, ammonium hydrogen carbonate, sodium hydrogen carbonate, ammonium nitrite, sodium borohydride, and monosodium citrate anhydrate.

In particular, from the viewpoint of obtaining fine cells and the viewpoint of economic efficiency and safety, an azo compound and a nitroso compound are preferred; azodicarbonamide, azobisisobutyronitrile, and N,N'-dinitrosopentamethylenetetramine are more preferred; and azodicarbonamide is particularly preferred. These thermally decomposable foaming agents may be used singly or may be used in combination of two or more.

The content of a thermally decomposable foaming agent for appropriate foaming without rupture of the cells in a foam is preferably 1 to 30 parts by mass, more preferably 2 to 15 parts by mass, relative to 100 parts by mass of the resin components.

(Cross-Linking Aid)

A multi-functional monomer may be used as cross-linking aid. Examples thereof include: a tri-functional (meth)acrylate compound such as trimethylolpropane trimethacrylate and trimethylolpropane triacrylate; a compound having three functional groups in a molecule such as trimellitic acid triallyl ester, 1,2,4-benzene tricarboxylic acid triallyl ester, and triallyl isocyanurate; a bi-functional (meth)acrylate compound such as 1,6-hexanediol dimethacrylate, 1,9-nonanediol dimethacrylate, 1,10-decanediol dimethacrylate, and neopentyl glycol dimethacrylate; a compound having two functional groups in a molecule such as divinylbenzene; diallyl phthalate, diallyl terephthalate, diallyl isophthalate, ethylvinylbenzene, lauryl methacrylate, and stearyl methacrylate. The cross-linking aid may be used singly or may be used in combination of two or more. Among them, tri-functional (meth)acrylate compound is more preferred.

The addition of a cross-linking aid to a foamable composition allows the foamable composition to be cross-linked with a smaller dose of ionizing radiation. As a result, the individual resin molecule is prevented from being cut or deteriorated by the exposure to ionizing radiation.

The content of the cross-linking aid is preferably 0.2 to 20 parts by mass, more preferably 0.5 to 15 parts by mass, relative to 100 parts by mass of the resin components. With a content of 0.2 parts or more, the foamable composition is easily controlled to a desired cross-linking degree during foaming. With a content of 20 parts by mass or less, the cross-linking degree to be imparted to a foamable composition can be easily controlled.

(Antioxidant)

Examples of the antioxidant include a phenol antioxidant, a sulfur antioxidant, a phosphorus antioxidant, an amine antioxidant. Among them a phenol antioxidant and a sulfur antioxidant are preferred, and use of a combination of a phenol antioxidant and a sulfur antioxidant is more preferred.

Examples of the phenol antioxidant include 2,6-di-tert-butyl-p-cresol, n-octadecyl-3-(3,5-di-tert-butyl-4-hydroxyphenyl)propionate, 2-tert-butyl-6-(3-tert-butyl-2-hydroxy-5-methylbenzyl)-4-methylphenylacrylate, tetrakis[methylene-3-(3,5-di-tert-butyl-4-hydroxyphenyl) propionate]methane. These phenol antioxidants may be used singly or may be used in combination of two or more.

Examples of the sulfur antioxidant include dilauryl thiodipropionate, dimyristyl thiodipropionate, distearyl thiodipropionate, pentaerythrityl tetrakis(3-lauryl thiopropionate). These sulfur antioxidants may be used singly or may be used in combination of two or more.

The content of the antioxidant is preferably 0.1 to 10 parts by mass, more preferably 0.2 to 5 parts by mass, relative to 100 parts by mass of resin components.

On an as needed basis, the foamable composition may contain an additive other than the above-described ones such as an agent for adjusting decomposition temperature such as zinc oxide, zinc stearate and urea, a flame retardant, a metal toxicity inhibitor, an antistatic agent, a stabilizer, a filler, and a pigment.

<Manufacturing Method of Foam>

A foam may be manufactured by cross-linking a foamable composition containing, for example, the components (A), (B) and (C), other resin components to be blended on an as needed basis, and an additive such as a thermally decomposable foaming agent so as to have a cross-linking degree of 30 to 50%, and then causing the composition to foam by heating. More specifically, manufacturing by a method including the following steps (1) to (3) is industrially advantageous.

Step (1): A step of supplying each of the components of a foamable composition containing a thermally decomposable foaming agent to a kneader so as to be melt-kneaded at a temperature lower than the decomposition temperature of the thermally decomposable foaming agent, and then forming a foamable composition to a desired shape such as a sheet form.

Step (2): A step of irradiating the foamable composition obtained in the step (1) with ionizing radiation so as to have a cross-linking degree of 30 to 50%.

Step (3): A step of obtaining a foam by heating the foamable composition cross-linked in the step (2) to a decomposition temperature of the foaming agent or higher so as to cause foaming.

Examples of the kneader in the step (1) include an extruder such as a mono-axial extruder and a bi-axial extruder, a Banbury mixer, and a general-purpose kneader such as rolls. Among them, an extruder is preferred.

Examples of the ionizing radiation for use in the step (2) include α ray, β ray, and γ ray, and electron beam. Among them, electron beam is preferred. The dose of irradiation of the ionizing radiation is preferably 0.1 to 10 Mrad, more preferably 0.2 to 5 Mrad, still more preferably 0.5 to 3 Mrad, though not particularly limited as long as a desired cross-linking degree can be obtained. The dose of irradiation of the ionizing radiation is affected by the ratio between the components (A), (B) and (C), the additives and the like. Accordingly the dose of irradiation is typically controlled while the cross-linking degree is measured at the same time.

The temperature to cause foaming of a foamable composition by heating in the step (3) is typically 140 to 300° C., preferably 150 to 260° C., depending on the decomposition temperature of the thermally decomposable foaming agent for use as foaming agent. In the step (3), the foam may be stretched in one or both of the MD direction or the CD direction during or after foaming.

<Laminate>

The laminate of the present invention is a laminate including a foam and a sheet material laminated on the foam. In the laminate, the foam is in a sheet form and the sheet material is typically bonded to the foam. Examples of the sheet material include a resin sheet and a thermoplastic elastomer sheet, and a fabric. In the case of a laminate for use as interior material for vehicles, a polyvinyl chloride sheet, a resin sheet from a mixed resin of polyvinyl chloride and an ABS resin, a thermoplastic elastomer sheet, and various fabrics such as woven, knitted and nonwoven fabrics, leather, artificial leather, and synthesized leather are preferably used. These materials in a sheet form are preferably disposed on the surface of a formed product formed from a laminate.

In a laminate, the sheet material may be provided on one or both surfaces of a foam. For example, in a laminate for use as interior material of vehicles, the resin sheet, the thermoplastic elastomer sheet, or the fabric may be laminated on one surface of the foam and the resin sheet from polyethylene, polypropylene, or the like may be disposed on another surface.

<Formed product>

In the present invention, the foam or the laminate is formed to a formed product by a known method. Examples of the forming method include vacuum forming, compression molding and stamping. Among them, vacuum forming is preferred. The vacuum forming includes forming over a male mold and forming in a female mold. The vacuum forming in a female mold is preferred.

In the case of a formed product formed from a laminate having a sheet material, the surface of the sheet material is preferably provided with projection and depression pattern. The projection and depression pattern are typically transferred from the surface projection and depression pattern of a mold during forming. On this occasion, the formed product is preferably formed by vacuum forming in a female mold.

The formed product is used as an insulator, a cushion, and the like. In an automobile field, preferably the formed product is used as an interior material for vehicles such as a ceiling material, a door, and an instrument panel.

EXAMPLES

The present invention is further described in detail with reference to Examples as follows. The present invention is not limited to Examples, though.

The method for measuring each of the physical properties and the method for evaluating a foam are as follows.

(1) Cross-linking degree

A test piece of about 100 mg was sampled from a foam. The weight A (mg) of the test piece was accurately measured. Subsequently the test piece was immersed in 30 cm$^3$ of xylene at 120° C. and left standing for 24 hours. The test piece was then filtered with a 200-mesh metal screen, and insoluble components on the metal mesh were sampled and vacuum-dried. The weight B (mg) of the insoluble components was accurately measured. From the measured value, the cross-linking degree (wt %) was calculated based on the following formula.

$$\text{Cross-linking degree (wt \%)}=100\times(B/A)$$

(2) MFR

The MFR value was measured under conditions with a temperature of 230° C. and a load of 2.16 kgf for polypropylene, and with a temperature of 190° C. and a load of 2.16 kgf for polyethylene, in accordance with JIS K7210.

(3) Density

The density of a foam was as measured in accordance with JIS K7222. The density of each of the resin components was as measured in accordance with JIS K7112.

(4) Elongation at break and 100% modulus

The elongation at break and the 100% modulus were measured at 160° C. in accordance with the method described in JIS K6251.

(5) Sheeting property

The foamed sheet obtained in each of the Examples or Comparative Examples was evaluated by the following evaluation criteria to check the processability in forming a foamed sheet from a foamable composition.

A: Surface not roughened, in good surface conditions.
B: Surface roughened to some degree, with no practical problem.
C: Surface roughened, practically useless.
D: Incapable of being formed to a sheet.

(6) Formability

The foamed sheet obtained in each of the Examples or Comparative Examples was vacuum formed in a cup for female forming at a surface temperature of 160° C. for evaluating formability. With D representing the diameter of the cup, and H representing the depth, the ratio of the depth H to the diameter D (H/D) was increased in each vacuum forming. The formability were evaluated by the ratio H/D when a rupture occurred in a foamed sheet or when a thin transparent part occurred in a part of a foamed sheet.

In practical use, the sizes of a formed product are different depending on the density of a foam. Accordingly the evaluation criteria were different for each of the density ranges as follows.

(Evaluation Criteria)

Density: 0.036 g/cc or more and less than 0.044 g/cc

A: 0.8 < H/D  B: 0.75 < H/D ≤ 0.8
C: 0.7 < H/D ≤ 0.75  D: H/D ≤ 0.7

Density: 0.044 g/cc or more and less than 0.057 g/cc

A: 0.82 < H/D  B: 0.77 < H/D ≤ 0.82
C: 0.72 < H/D ≤ 0.77  D: H/D ≤ 0.72

Density: 0.057 g/cc or more and less than 0.077 g/cc

A: 0.84 < H/D  B: 0.79 < H/D ≤ 0.84
C: 0.74 < H/D ≤ 0.79  D: H/D ≤ 0.74

Density: 0.077 g/cc or more and less than 0.133 g/cc

A: 0.86 < H/D  B: 0.81 < H/D ≤ 0.86
C: 0.76 < H/D ≤ 0.81  D: H/D ≤ 0.76

Examples 1 to 10 and Comparative Examples 1 to 9

In each of the Examples and Comparative Examples, the resin components and additives in parts by mass shown in Table 1 were supplied to a mono-axial extruder, melt-kneaded at a resin temperature of 190° C., and extruded to obtain a foamable composition in a sheet form with a thickness of 1.3 mm. Both surfaces of the foamable composition in a sheet form was irradiated with electron beams at an acceleration voltage 800 kV with an irradiation dose shown in Table 1 to cross-link the foamable composition, where the dose was set to produce a predetermined degree of cross-linking. Subsequently foaming of the cross-linked foamable composition was caused in an oven with a gas phase at 250° C., so that a foamed sheet (foam) was obtained. The evaluation results of the foam in each of the Examples and Comparative Examples are shown in Table 1.

TABLE 1

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Foamable composition (part by mass) | Resin component (part by mass) | Homo PP1 (A) | 15 | 15 | 15 | 15 | — | — | 30 | 52 | 15 | 15 |
| | | Homo PP2 (A) | — | — | — | — | 15 | — | — | — | — | — |
| | | Homo PP3 (A) | — | — | — | — | — | — | — | — | — | — |
| | | Homo PP4 (A) | — | — | — | — | — | — | — | — | — | — |
| | | Homo PP5 (A) | — | — | — | — | — | 15 | — | — | — | — |
| | | Random PP (B) | 55 | 55 | 55 | 55 | 55 | 55 | 35 | 18 | 55 | 55 |
| | | LLDPE (C) | 30 | 30 | 30 | 30 | 30 | 30 | 35 | 32 | 30 | 30 |
| | Additive (part by mass) | Cross-linking aid | 3 | 3 | 3 | 3 | 3 | 3 | 3 | 3 | 3 | 3 |
| | | Foaming agent | 7.5 | 6.2 | 4.4 | 2.7 | 7.5 | 7.5 | 7.5 | 7.5 | 7.5 | 7.5 |
| | | Anti-oxidant 1 | 0.3 | 0.3 | 0.3 | 0.3 | 0.3 | 0.3 | 0.3 | 0.3 | 0.3 | 0.3 |
| | | Anti-oxidant 2 | 0.3 | 0.3 | 0.3 | 0.3 | 0.3 | 0.3 | 0.3 | 0.3 | 0.3 | 0.3 |
| Mass ratio | | B/A | 3.67 | 3.67 | 3.67 | 3.67 | 3.67 | 3.67 | 1.17 | 0.35 | 3.67 | 3.67 |
| | | C/A | 2.00 | 2.00 | 2.00 | 2.00 | 2.00 | 2.00 | 1.17 | 0.62 | 2.00 | 2.00 |
| MFR (g/10 min) | | Homo PP | 9 | 9 | 9 | 9 | 15 | 4 | 9 | 9 | 9 | 9 |
| | | Random PP | 0.8 | 0.8 | 0.8 | 0.8 | 0.8 | 0.8 | 0.8 | 0.8 | 0.8 | 0.8 |
| | | LLDPE | 2.3 | 2.3 | 2.3 | 2.3 | 2.3 | 2.3 | 2.3 | 2.3 | 2.3 | 2.3 |
| Cross-linking Condition: 800 kV electron beam (Mrad) | | | 1.0 | 1.0 | 1.0 | 1.0 | 1.0 | 1.0 | 1.0 | 1.0 | 1.4 | 0.8 |

TABLE 1-continued

| | | | | | | | | | | | |
|---|---|---|---|---|---|---|---|---|---|---|---|
| Foam | Cross-linking degree | | 40% | 41% | 39% | 42% | 41% | 40% | 39% | 40% | 46% | 33% |
| | Density (g/cc) | | 0.041 | 0.052 | 0.067 | 0.098 | 0.04 | 0.042 | 0.042 | 0.041 | 0.042 | 0.039 |
| | Thickness (mm) | | 1.3 | 1.3 | 1.3 | 1.3 | 1.3 | 1.3 | 1.3 | 1.3 | 1.3 | 1.3 |
| | Elongation at break (%) | | 180 | 185 | 240 | 340 | 185 | 175 | 170 | 152 | 152 | 202 |
| | 100% Modulus (MPa) | | 0.044 | 0.048 | 0.060 | 0.071 | 0.041 | 0.052 | 0.062 | 0.062 | 0.062 | 0.035 |
| | SS coefficient | | 7.9 | 8.9 | 14.4 | 24.1 | 7.6 | 9.1 | 10.5 | 9.4 | 9.4 | 7.1 |
| Evaluation result | Sheeting property | | A | A | A | A | B | B | B | B | A | A |
| | Formability | | A | A | A | A | A | A | A | B | B | B |

| | | | Comparative Example |||||||||
|---|---|---|---|---|---|---|---|---|---|---|---|
| | | | 1 | 2 | 3 | 4 | 5 | 6 | 7 | 8 | 9 |
| Foamable composition | Resin component (part by mass) | Homo PP1 (A) | — | 15 | 15 | 15 | 15 | 15 | — | 70 | — |
| | | Homo PP2 (A) | — | — | — | — | — | — | — | — | — |
| | | Homo PP3 (A) | 15 | — | — | — | — | — | — | — | — |
| | | Homo PP4 (A) | — | — | — | — | — | — | — | — | 15 |
| | | Homo PP5 (A) | — | — | — | — | — | — | — | — | — |
| | | Random PP (B) | 55 | 55 | 55 | 55 | 55 | 55 | 70 | — | 55 |
| | | LLDPE (C) | 30 | 30 | 30 | 30 | 30 | 30 | 30 | 30 | 30 |
| | Additive (part by mass) | Cross-linking aid | 3 | 3 | 3 | 3 | 3 | 3 | 3 | 3 | 3 |
| | | Foaming agent | 7.5 | 7.5 | 6.2 | 4.4 | 2.7 | 7.5 | 7.5 | 7.5 | 7.5 |
| | | Antioxidant 1 | 0.3 | 0.3 | 0.3 | 0.3 | 0.3 | 0.3 | 0.3 | 0.3 | 0.3 |
| | | Antioxidant 2 | 0.3 | 0.3 | 0.3 | 0.3 | 0.3 | 0.3 | 0.3 | 0.3 | 0.3 |
| Mass ratio | | B/A | 3.67 | 3.67 | 3.67 | 3.67 | 3.67 | 3.67 | — | — | — |
| | | C/A | 2.00 | 2.00 | 2.00 | 2.00 | 2.00 | 2.00 | — | 0.43 | — |
| MFR (g/10 min) | | Homo PP | 1.3 | 9 | 9 | 9 | 9 | 9 | — | 9 | 30 |
| | | Random PP | 0.8 | 0.8 | 0.8 | 0.8 | 0.8 | 0.8 | 0.8 | — | 0.8 |
| | | LLDPE | 2.3 | 2.3 | 2.3 | 2.3 | 2.3 | 2.3 | 2.3 | 2.3 | 2.3 |
| Cross-linking Condition: 800 kV electron beam (Mrad) | | | 1.0 | 2.0 | 2.0 | 2.0 | 2.0 | 0.6 | 1.0 | 1.0 | 1.0 |
| Foam | Cross-linking degree | | 41% | 53% | 54% | 55% | 53% | 27% | 38% | 42% | 37% |
| | Density (g/cc) | | 0.041 | 0.042 | 0.052 | 0.068 | 0.101 | 0.038 | 0.039 | 0.041 | 0.038 |
| | Thickness (mm) | | 1.3 | 1.3 | 1.3 | 1.3 | 1.3 | 1.3 | 1.3 | 1.3 | 1.3 |
| | Elongation at break (%) | | — | 126 | 131 | 180 | 220 | 225 | 198 | 122 | — |
| | 100% Modulus (MPa) | | — | 0.064 | 0.068 | 0.081 | 0.091 | 0.022 | 0.027 | 0.102 | — |
| | SS coefficient | | — | 8.1 | 8.9 | 14.6 | 20.0 | 5.0 | 5.3 | 12.4 | — |
| Evaluation result | Sheeting property | | D | A | A | A | A | A | B | B | D |
| | Formability | | — | D | D | D | D | C | C | D | — |

The resin components and the additives each for use in each of the Examples and comparative Examples were as follows.

Homo PP1: homopolypropylene, product name: J105G, manufactured by Prime Polymer Co., Ltd., MFR=9 g/10 min.

Homo PP2: homopolypropylene, product name: J106G, manufactured by Prime Polymer Co., Ltd., MFR=15 g/10 min.

Homo PP3: homopolypropylene, product name: EA7AD, manufactured by Japan Polypropylene Corporation, MFR=1.3 g/10 min.

Homo PP4: homopolypropylene, product name: J3000GP, manufactured by Prime Polymer Co., Ltd., MFR=30 g/10 min.

Homo PP5: homopolypropylene, product name: Y400-GP, manufactured by Prime Polymer Co., Ltd., MFR=4 g/10 min.

Random PP: ethylene-propylene random copolymer, product name: EG8, manufactured by Japan Polypropylene Corporation, MFR=0.8 g/10 min, ethylene content: 3 mass %

LLDPE: linear low-density polyethylene, product name: 2047G, manufactured by The Dow Chemical Company, Japan, MFR=2.3 g/10 min.

Cross-linking aid: trimethylol propane trimethacrylate
Foaming agent: azodicarbonamide
Antioxidant 1:2,6-di-tert-butyl-p-cresol
Antioxidant 2: dilauryl thiodipropionate As described above, the foams in Examples 1 to 10 having a cross-linking degree of 30 to 50%, with a high elongation at break at 160° C. of 150% or more and a high SS coefficient of 7 or more had good elasticity, mechanical strength and the like under high temperature. As a result, the foams had good formability under high temperature.

In contrast, as shown in Comparative Examples 2 to 8, with any one of the elongation at break at 160° C., the SS coefficient, and the cross-linking degree being outside the ranges described above, the elasticity, the mechanical strength and the like of a foam under high temperature lowered, so that the formability of the foam was insufficient. In Comparative Examples 1 or 9, the MFR of homopolypropylene (A) was too low or too high to provide a good sheeting property for the foamable composition, which could not be processed into a foam.

The invention claimed is:

1. A foam having a density of 0.036 g/cc or more and less than 0.133 g/cc, wherein the foam has an elongation (%) at break at 160° C. of 150% to 350% as measured in accordance with JIS K6251, wherein the foam has a value of 7 to 25 obtained by multiplying the elongation (%) at break by a 100% modulus (MPa) at 160° C. as measured in accordance with JIS K6251, and a cross-linking degree of 33 to 46%, and wherein the foam is made by cross-linking and foaming a foamable composition comprising 15 to 55 parts by mass of a homopolypropylene (A), 15 to 55 parts by mass of a random polypropylene (B) and 30 to 35 parts by mass of a linear low-density polyethylene (C).

2. The foam according to claim 1 having a density of 0.036 g/cc or more and less than 0.044 g/cc, wherein the foam has an elongation (%) at break at 160° C. of 150% to 240% as measured in accordance with JIS K6251, and
wherein the foam has a value of 7 to 15 obtained by multiplying the elongation (%) at break by a 100% modulus (MPa) at 160° C. as measured in accordance with JIS K6251.

3. The foam according to claim 1 having a density of 0.044 g/cc or more and less than 0.057 g/cc, wherein the foam has an elongation (%) at break at 160° C. of 170% to 300% as measured in accordance with JIS K6251, and wherein the foam has a value of 8 to 20 obtained by multiplying the elongation (%) at break by a 100% modulus (MPa) at 160° C. as measured in accordance with JIS K6251.

4. The foam according to claim 1 having a density of 0.057 g/cc or more and less than 0.077 g/cc, wherein the foam has an elongation (%) at break at 160° C. of 200% to 350% as measured in accordance with JIS K6251, and
wherein the foam has a value of 10 to 25 obtained by multiplying the elongation (%) at break by a 100% modulus (MPa) at 160° C. as measured in accordance with JIS K6251.

5. The foam according to claim 1 having a density of 0.077 g/cc or more and less than 0.133 g/cc, wherein the foam has an elongation (%) at break at 160° C. of 250% to 350% as measured in accordance with JIS K6251, and
wherein the foam has a value of 15 to 25 obtained by multiplying the elongation (%) at break by a 100% modulus (MPa) at 160° C. as measured in accordance with JIS K6251.

6. The foam according to claim 1,
wherein the homopolypropylene (A) is in an amount of 10 to 60 mass % relative to the total resin components in the foamable composition, and has a melt flow rate of 2.5 to 20 g/10 min.

7. The foam according to claim 6, wherein the homopolypropylene (A) has a melt flow rate of 6 to 12 g/10 min.

8. The foam according to claim 6, wherein the foamable composition comprises the homopolypropylene (A), the random polypropylene (B) and the linear low-density polyethylene (C) in a mass ratio (B)/(A) of 0.16 to 8 and a mass ratio (C)/(A) of 0.16 to 8.

9. The foam according to claim 6, wherein the foamable composition comprises 10 mass % or more and less than 20 mass % of the homopolypropylene (A) relative to the total resin components in the composition.

10. The foam according to claim 9, wherein the foamable composition comprises the homopolypropylene (A), the random polypropylene (B) and the linear low-density polyethylene (C) in a mass ratio (B)/(A) of 1.6 to 5 and a mass ratio (C)/(A) of 1.6 to 5.

11. The foam according to claim 6, wherein the random polypropylene (B) has a melt flow rate of 0.4 to 2.0 g/10 min, and the linear low-density polyethylene (C) has a melt flow rate of 1.5 to 15 g/10 min.

12. The foam according to claim 6, wherein the random polypropylene (B) is an ethylene-propylene random copolymer.

13. The foam according to claim 1, having a sheet form with a thickness of 0.5 to 5.0 mm.

14. A laminate comprising the foam according to claim 1 and a sheet material laminated on the foam.

15. A formed product formed from the foam according to claim 1.

16. A formed product formed from the laminate according to claim 14.

17. A formed product formed from the laminate according to claim 14, wherein the sheet material has a surface with projection and depression pattern.

* * * * *